United States Patent
Voit et al.

(10) Patent No.: US 7,839,855 B2
(45) Date of Patent: Nov. 23, 2010

(54) LAYER 2 ADDRESS TRANSLATION FOR SERVICE PROVIDER WHOLESALE IP SESSIONS

(75) Inventors: Eric Voit, Bethesda, MD (US); Richard Manfred Pruss, Tewantin (AU)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 11/651,855

(22) Filed: Jan. 9, 2007

(65) Prior Publication Data

US 2008/0165781 A1    Jul. 10, 2008

(51) Int. Cl.
  *H04L 12/28* (2006.01)
(52) U.S. Cl. .................................. 370/392; 370/401
(58) Field of Classification Search ................. None
  See application file for complete search history.

(56) References Cited

U.S. PATENT DOCUMENTS

| | | | | |
|---|---|---|---|---|
| 2002/0107023 A1* | 8/2002 | Chari et al. | ................. | 455/445 |
| 2002/0186698 A1* | 12/2002 | Ceniza | ....................... | 370/401 |
| 2005/0114522 A1* | 5/2005 | LaVigne et al. | ............. | 709/228 |
| 2005/0147097 A1* | 7/2005 | Chari et al. | ................. | 370/392 |
| 2006/0028983 A1* | 2/2006 | Wright | ....................... | 370/230 |

* cited by examiner

*Primary Examiner*—Chirag G Shah
*Assistant Examiner*—Jenkey Van
(74) *Attorney, Agent, or Firm*—BainwoodHuang

(57) ABSTRACT

A method involving receiving, at a network device, a first layer 2 network packet from a client, the first layer 2 network packet encapsulating a layer 3 network packet; forwarding the first layer 2 network packet to a server by associating the layer 3 destination host with a particular server connected to the network device, creating a modified first layer 2 network packet by overwriting the layer 2 destination address of the first layer 2 network packet with the layer 2 network address of the server, and sending the modified first layer 2 network packet over a network; receiving, at the network device, a second layer 2 network packet from the server; and forwarding the second layer 2 network packet to the client by creating a modified second layer 2 network packet by overwriting the layer 2 source address of the second layer 2 network packet with the layer 2 network address of the network device and sending the modified second layer 2 network packet over a network.

16 Claims, 3 Drawing Sheets

LAYER 2 ADDRESS TRANSLATION FOR SERVICE PROVIDER WHOLESALE IP SESSIONS

TECHNICAL FIELD

The present disclosure relates generally to computer networking.

BACKGROUND

In order to communicate information between computers, computer networks are utilized. Many computer networks operate according to a set of layered protocols, called a network model. One network model is generally described in the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein. Another popular network model is the TCP/IP model. This description will focus on the OSI model, although it is equally applicable to other network models, such as the TCP/IP model. The OSI model defines a physical layer (layer 1), a data-link layer (layer 2), an internetwork layer (layer 3), a transport layer (layer 4), and several other layers. Each layer adds a header (and optionally a footer) to a packet of data from the next lower layer. One popular protocol is the Ethernet protocol, which operates across layers 1 and 2. Ethernet systems assign unique Media Access Control (MAC) addresses to network devices. One popular layer 3 protocol is the Internet Protocol (IP). The IP protocol assigns IP addresses to network devices.

In order to connect Customer Premises Equipment (CPE) to the Internet, a client will generally connect through an Access Service Provider (ASP) to an Internet Service Provider (ISP), which provides a connection to the Internet. Although the ISP and ASP are sometimes under the control of a single entity, they are sometimes under the control of distinct entities. The CPE will contain some sort of access device, such as a modem, a DSL modem, a cable modem, or a direct Ethernet interface. The access device will then typically establish a connection to an Access Module provided by the ASP (although this step may be omitted in the case of a direct Ethernet interface). This Access Module may be, for example, a DSLAM in the case of a DSL connection. The Access Module will then transmit signals from the CPE across a local network eventually ending up at a Broadband Remote Access Server (BRAS) under the control of an ISP. The BRAS serves as a gateway to the Internet. The local network of the ASP typically operates as a layer 2 network, ignoring layer 3 and subsequent layer headers. The BRAS acts as a router, which utilizes layer 3 data. Multiple ISPs will sometimes contract with a single ASP to provide access to clients. Various layer 3 services, such as Voice Over IP (VOIP) and Video on Demand (VOD) may be provided over the Internet. Sometimes, an ASP will desire to provide these services directly to clients over the local access network. One prior art approach to add these layer 3 services into the layer 2 network of the ASP is to position VOIP and VOD servers along a layer 3 edge of the network. In order to accomplish this, the CPE must be programmed to serve as a router, and it must be able to route packets directly to these servers in addition to the packets that it routes to the BRAS.

BRIEF DESCRIPTION OF THE DRAWINGS

Objects, features, and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Certain embodiments of the present invention provide improved methods for providing Internet access as well as local services to a client in a wholesale environment. Wholesale network access providers, or ASPs, provide access to various ISPs for Internet access. The ASPs also may provide local services within the ASPs' local wholesale network.

In one embodiment, a method is provided for operating a Bus Access Gateway (BAG) for controlling network traffic within the wholesale network. In this method, the BAG receives packets from clients and forwards these packets on to the appropriate servers. When forwarding these packets, the BAG maintains the source MAC address as the MAC address of the client, while overwriting the destination MAC address with the MAC address of the recipient server. When the BAG receives packets from a server addressed to a client, the BAG forwards the packet on to the client, overwriting the source MAC address to be the MAC address of the BAG.

In another embodiment, an apparatus is provided for controlling network traffic within the wholesale network. This apparatus is the BAG, which performs a method as described above.

In another embodiment, a system is provided for controlling network traffic. The system includes customer premises equipment, a BAG as described above, and servers for providing local services as well as retail Internet connections through various ISPs.

Description of Example Embodiments

Figure 1:
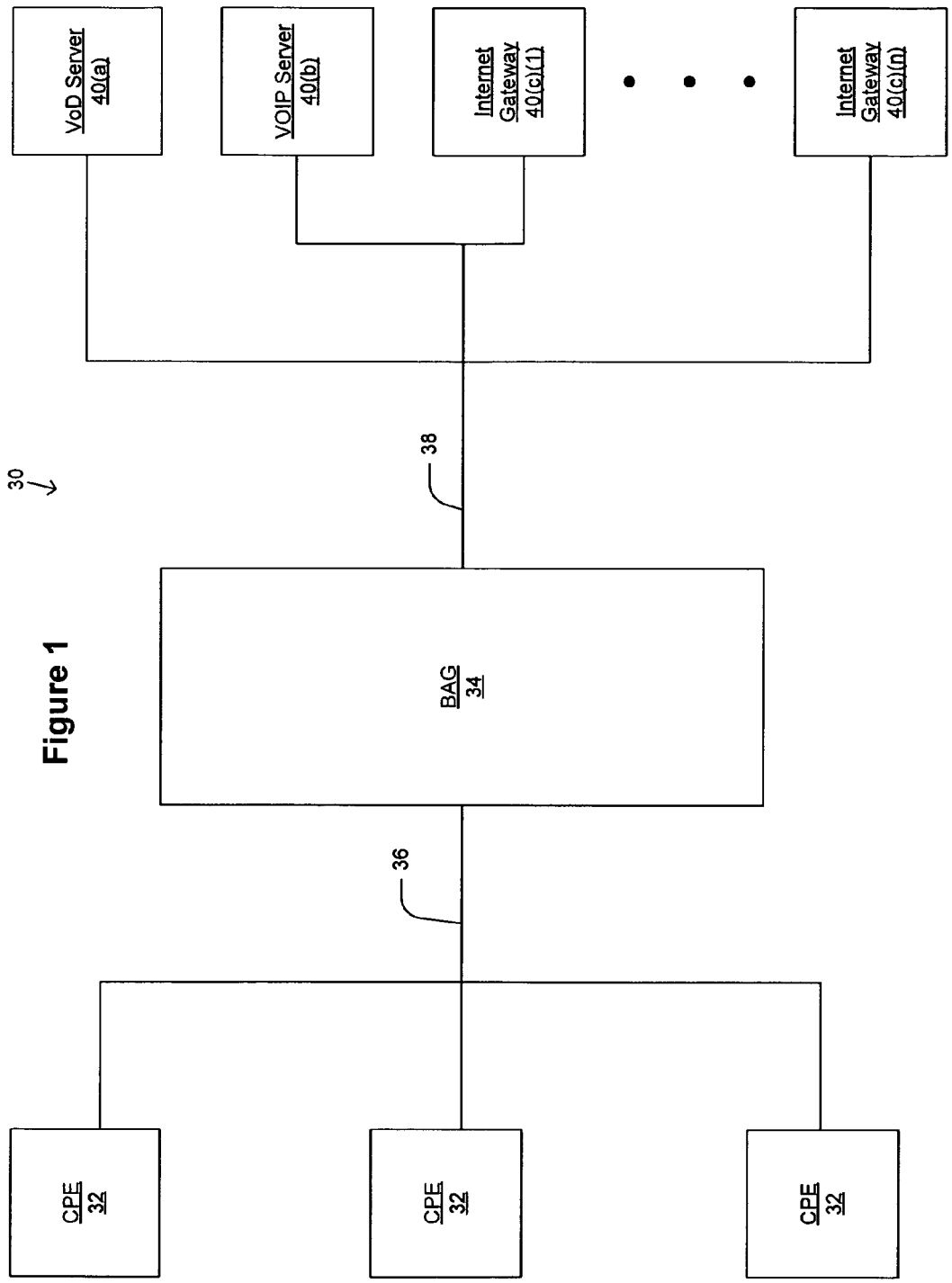
FIG. 1 illustrates an example system for providing Internet access and local services to a client.

Certain embodiments are directed to a system 30 for controlling network traffic within a wholesale access network of an ASP. FIG. 1 depicts customer premises equipment (CPE) 32 connected to a BAG 34 via an access network 36. The BAG 34 is also connected to a second network 38 that provides a connection to a plurality of servers 40. These servers 40 may include, for example, a Video On Demand (VoD) server 40(a), a Voice Over Internet Protocol (VOIP) server 40(b), and various Internet gateway servers 40(c)(1)-40(c)(n). The Internet gateway servers 40(c), which are also known as Broadband Remote Access Servers (BRAS), may be under control of the ASP, or they may be under the control of various Internet retailers, also known as ISPs, while the other servers 40(a), 40(b) are under the control of the ASP.

Figure 2:
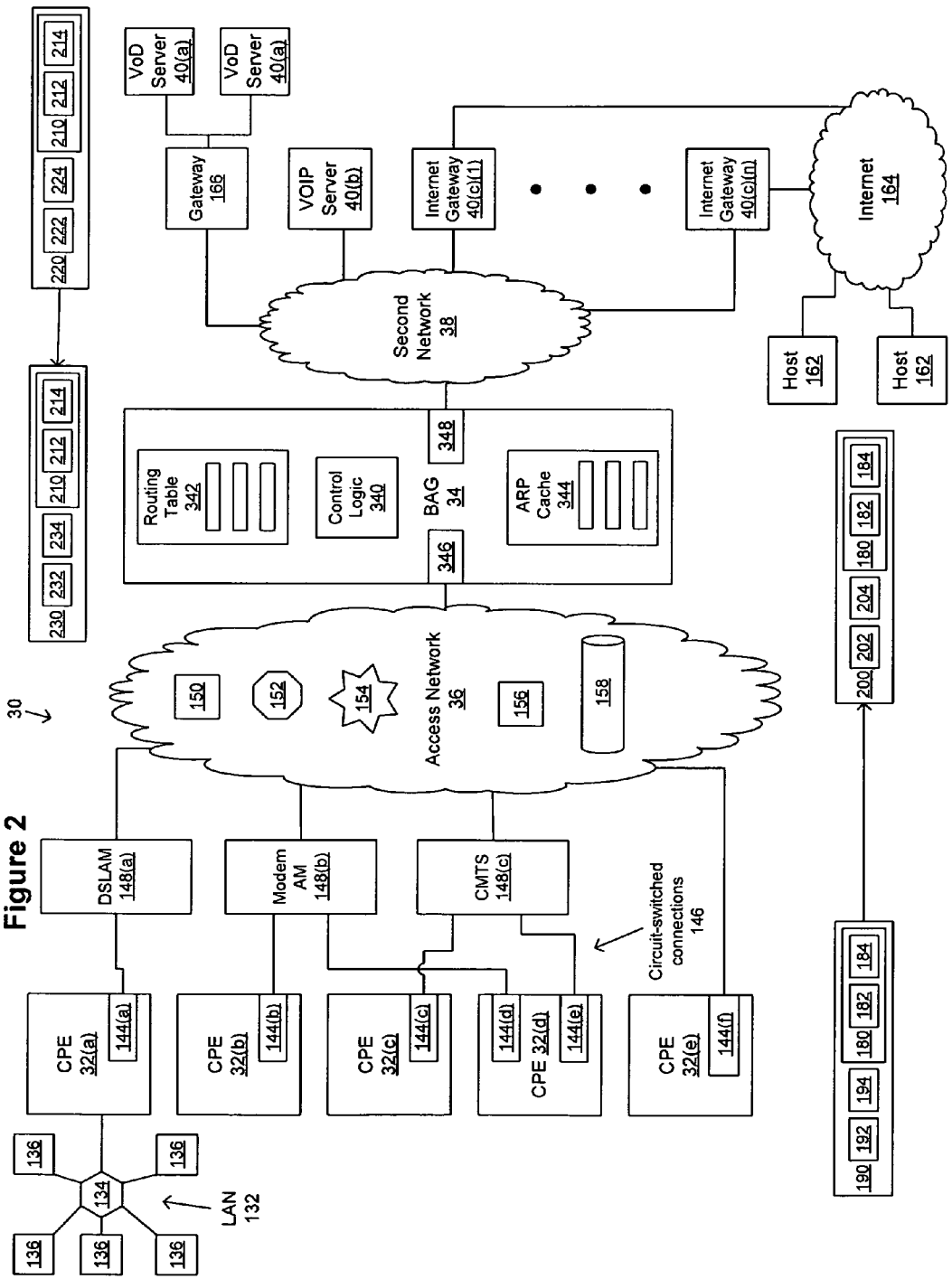
FIG. 2 illustrates an example system for providing Internet access and local services to a client, providing greater detail as to the Access Service network.

FIG. 2 depicts the system shown in FIG. 1 in more detail. A CPE 32 may be connected to a local area network 132. So, for example, the CPE 32 may be connected to a router 134 that performs Network Address Translation (NAT) to provide Internet (and other network) access to computers 136 on the local area network 132 via the CPE 32.

The CPE 32 may include various access devices 144. For example, one CPE 32(a) might include a Digital Subscriber Line (DSL) modem 144(a), while another CPE 32(b) might include a Plain Old Telephone System (POTS) modem 144(b), and another CPE 32(c) might include a cable modem 144(c). Other CPEs 32(d) might include multiple access devices 144(d), 144(e). These access devices 144 typically connect over circuit-switched connections 146 to access modules (AM) 148. The AMs may be, for example, a DSLAM 148(a), a multi-port modem bridged to an Ethernet card 148(b), or a cable modem termination system (CMTS) 148(c). The AMs 148 provide a connection to the access network 36, for example, an Ethernet network. Some CPEs 32(e) might connect directly to the access network. The access devices 144(f) in these CPEs 32(e) are network interface cards, configured to connect to, for example, an Ethernet network, such as the access network 36.

The access network 36 is a layer 2 network. It may contain repeaters 150, hubs 152, switches 154, and bridges 156, but these are generally transparent to the CPEs 32 and the BAG 34, to which the access network 36 is connected. The access network 36 may even contain pseudowires 158, which may utilize a layer 2 protocol distinct from the protocols utilized by the access modules 148, CPEs 32 and BAG 34. These pseudowires 158 are also generally transparent to the CPEs 32 and the BAG 34.

The second network 38 may directly connect to the servers 40. The second network 38 may also connect to gateways 166. Some or all of the servers 40 may connect to the gateways 166 instead of to the second network 38.

When a client wishes to communicate with a server 40 or with a host 162 on the Internet 164, the CPE 32 sends a layer 3 packet 180 addressed to the server 40 or host 162 that it wishes to contact. This layer 3 packet 180 is then encapsulated within a layer 2 packet 190 having the MAC address of the CPE 32 as its layer 2 source address 192 and the MAC address of the BAG 34 as its layer 2 destination address 194.

Figure 3:
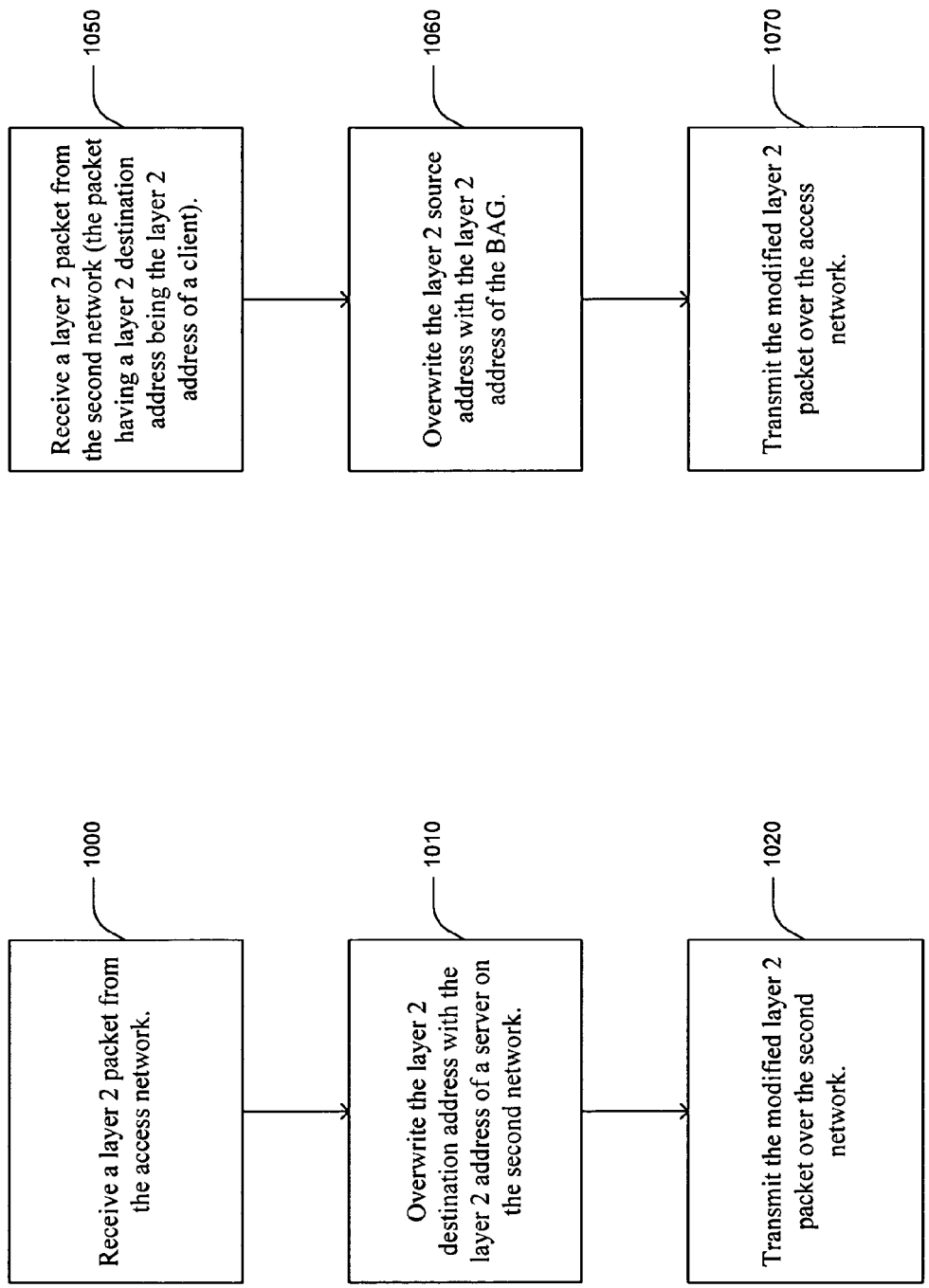
FIG. 3 illustrates an example method for providing Internet access and local services to a client.

The BAG 34 is a network device having at least two network interfaces 346, 348 and having both layer 2 and layer 3 functionality. The BAG 34 performs a method, as depicted in FIG. 3, via control logic 340. When the BAG 34 receives a layer 2 packet 190 from the access network 36 (Step 1000), it passes that layer 2 packet 190 on to the second network 38, to create a modified layer 2 packet 200 (Step 1020), but before doing so, it overwrites the layer 2 destination address 194 from the incoming packet 190 with the layer 2 address of a next-hop layer 3 device (i.e., a server 40 or gateway 166) on the second network 38 to form the outgoing layer 2 destination address 204 of the outgoing packet 200 (Step 1010). However, it leaves the layer 2 source address 192 (which is 202 in the outgoing packet 200) (which is the MAC address of the CPE 32) and the layer 3 headers 182, 184 unchanged.

The BAG 34 determines which next-hop layer 3 device to send the packet 200 to (correlating the layer 3 destination address with a gateway or server) by checking the layer 3 destination address 184 against a routing table 342. For example, if the layer 3 destination address 184 is the layer 3 address of a server 40 on the second network 38, then the routing table will (if properly configured) point directly at the server 40, otherwise the routing table will point to a next-hop layer 3 device that is configured to connect to the desired server 40 or host 162 having layer 3 destination address 184.

Once the BAG 34 determines which next-hop layer 3 device to route the packet 200 to, it overwrites the layer 2 destination address 194 from the incoming packet 190 with the layer 2 address of the desired next-hop layer 3 device on the second network 38 to form the outgoing layer 2 destination address 204 of the outgoing packet 200 (Step 1010). In order to determine the layer 2 address of the next-hop layer 3 device, the BAG 34 first checks an Address Resolution Protocol (ARP) cache 344. The ARP cache 344 contains a mapping of level 3 addresses to level 2 addresses. If there is no ARP cache entry 346 for the next-hop layer 3 device, the BAG 34 sends out an ARP request to find the layer 2 address of the next-hop layer 3 device.

When a server 40 or a host 162 on the Internet 164 wishes to communicate with a client, that server 40 or host 162 sends a layer 3 packet 210 addressed to the CPE 32 of the client. A host-generated layer 3 packet will eventually reach a server 40 or gateway 166. The server 40 or gateway 166 then encapsulates the layer 3 packet 210 within a layer 2 packet 220 having the MAC address of the CPE 32 as its layer 2 destination address 224 and sends the layer 2 packet 220 out on the second network 38. The server 40 or gateway 166 typically knows the MAC address of the CPE 32 because typically the CPE 32 will contact each server 40 before the server 40 contacts the CPE 32, and the server 40 can cache the layer 2 source address 192 of each CPE 32 that contacts it in its ARP cache 354. (If the server 40 initiates the communications session, it may not know the MAC address of the CPE, in which case, an alternate means of obtaining the MAC address of the CPE 32 must be utilized.)

The BAG 34 receives the layer 2 packet 220 over the second network 38 (Step 1050), even though the layer 2 packet 220 is not addressed to the BAG 34. This is because the BAG 34 monitors all packets that traverse the second network 38 (therefore, the second network 38 should either be unswitched, or the BAG 34 should serve as the switch for the second network 38, or the switch should be configured to forward all packets intended for a CPE 32 to the BAG). The BAG 34 forwards over the access network 36 all packets 220 addressed to any of the CPEs 32 that it manages. If there is only one BAG 34 on the second network, the BAG 34 connects exclusively to servers 40, gateways 166, and CPEs 32, and servers 40 never communicate with each other, then any packet 220 that the BAG 34 sniffs from the second network 38 (which the BAG 34 did not send out itself) may be forwarded over the access network 36 (in order to optimize speed). The BAG 34 forwards the layer 2 packet 220 on to the CPE 32 by sending it out over the access network 36 as a modified layer 2 packet 230 (Step 1070). However, prior to sending it out over the access network, the BAG 34 overwrites the layer 2 source address 222 with the layer 2 address of the BAG 34 to form a modified layer 2 source address 232 (Step 1060).

This system and method improve over the prior art because the layer 2 addresses of the servers 40 are hidden from the CPE 32. The layer 3 communications are not modified from the prior art. The CPE 32 addresses layer 3 packets 180 to the hosts 162 or servers 40 that it wishes to communicate with and servers 40 and hosts 162 address layer 3 packets 210 to the CPE 32. However, whereas the prior art method described in the background requires that the CPE maintain a routing table to communicate with various gateway servers, the disclosed embodiments do not require that the CPE 32 maintain a routing table. All packets 190 sent out by the CPE 32 are sent directly to the BAG 34. This is beneficial because when the routing table needs to be updated, only the routing table 342 within the BAG 34 needs to be changed. This avoids the need for clients to change their routing tables every time the servers 40 are reconfigured.

Another prior art solution requires using a true layer 3 router between the CPE and the servers. However, that solution does not allow the servers to each assign IP addresses to the clients (without resorting to a trick such as DHCP snooping). That is particularly defective when dealing with ISPs not under the control of the ASP, since the ISP will typically assign IP addresses to CPEs on the fly with DHCP, and the router may not know the IP address of each CPE. Even if the router manages to detect the IP address of each CPE using DHCP snooping, the solution is defective because the DHCP servers of multiple ISPs might operate within the same IP address space if the ISP uses NAT, and this could lead to multiple CPEs having the same IP address. It would also be defective because if a CPE had a very long DHCP lease or a fixed IP address, the router might not have an opportunity to learn the SPE IP address through DHCP snooping. In contrast, the embodiments herein described allow each server 40 to assign IP addresses to the client independently, because the BAG 34 does not perform routing on packets 220 sent from a server 40 to the CPE 32.

Thus, embodiments of the present invention provide improved methods for providing Internet access as well as local services to a client in a wholesale environment. Wholesale network access providers, or ASPs, provide access to various ISPs for Internet access. The ASPs also may provide local services within the ASPs' local wholesale network. In one embodiment, a method is provided for operating a BAG 34 for controlling network traffic within the wholesale network. In this method, the BAG 34 receives packets 180 from CPEs 32 and forwards these packets on to the appropriate next-hop layer 3 device. When forwarding these packets 200, the BAG 34 maintains the source MAC address 202 as the MAC address of the originating CPE 32, while overwriting the destination MAC address 204 with the MAC address of the recipient next-hop layer 3 device. When the BAG 34 receives packets 220 from a server 40 addressed to a CPE 32, the BAG 34 forwards the packet 230 on to the CPE 32, overwriting the source MAC address 232 to be the MAC address of the BAG 34. In another embodiment, an apparatus is provided for controlling network traffic within the wholesale network. This apparatus is the BAG 34, which performs a method as described above. In another embodiment, a system 30 is provided for controlling network traffic. The system 30 includes customer premises equipment 32, a BAG 34 as described above, and servers 40 for providing local services as well as retail Internet connections through various ISPs.

While various embodiments of the invention have been particularly shown and described, it will be understood by those skilled in the art that various changes in form and details may be made therein without departing from the spirit and scope of the invention as defined by the appended claims.

For example, embodiments have been described as using Ethernet and IP. However, other embodiments may use other layer 2 and layer 3 protocols.

As another example, additional types of servers 40 may be utilized besides VOIP servers 40(*a*), VOD servers 40(*b*), and Internet gateways 40(*c*).

As another example, the connection between a CPE 32 and an AM 148 was described as being carried over a circuit-switched network 146, however, other forms of connections are possible as well. For example, in the case of a cable modem and a CMTS, the connection might be a hybrid fiber-coaxial network using frequency division multiplexing. As an additional example, the connection might be a wireless connection, wherein the AM 148 is a wireless (e.g., 802.11 or 802.16) access point, and the access device 144 is a wireless network card.

As another example, the Internet gateways 40(*c*) were described as directly connecting to the second network 38. However, other means of connection are possible as well. For example, multiple Internet gateways 40(*c*) may be positioned behind a gateway 166. In this embodiment, the gateway 166 may be configured to assign traffic to one Internet gateway 40(*c*)(1) rather than another Internet gateway 40(*c*)(n) based on the client's MAC address or some other factor.

Finally, it should be understood that when the claims refer to a host, any computer which is connected to a network accessible by the client is meant. For example, the term "host" may refer to a computer which is on the Internet. The term may also refer to a server 40 on the ASP network (either second network 38, or a network accessible by a gateway 166).

What is claimed is:

1. A method comprising:

receiving, at a network device having a layer 2 network address, a first layer 2 network packet from a client, the first layer 2 network packet having a layer 2 destination address and a layer 2 source address, the layer 2 destination address of the first layer 2 network packet being the layer 2 network address of the network device, the first layer 2 network packet encapsulating a layer 3 network packet, the layer 3 network packet having a layer 3 destination address, the layer 3 destination address being a layer 3 network address of a host;

forwarding the first layer 2 network packet to a next-hop layer 3 device having a layer 2 network address by (a) associating the host with a particular next-hop layer 3 device connected to the network device, (b) creating a modified first layer 2 network packet by overwriting the layer 2 destination address of the first layer 2 network packet with the layer 2 network address of the next-hop layer 3 device, and (c) sending the modified first layer 2 network packet over a network, the modified first layer 2 network packet retaining the original layer 2 source address of the first layer 2 network packet;

receiving, at the network device, a second layer 2 network packet from the next-hop layer 3 device, the second layer 2 network packet having a layer 2 destination address and a layer 2 source address, the layer 2 destination address of the second layer 2 network packet being the layer 2 network address of the client; and forwarding the second layer 2 network packet to the client by (a) creating a modified second layer 2 network packet by overwriting the layer 2 source address of the second layer 2 network packet with the layer 2 network address of the network device and (b) sending the modified second layer 2 network packet over a network, the modified second layer 2 network packet retaining the original layer 2 destination address;

wherein the network device is connected to the client over a first layer 2 network and the network device is connected to the next-hop layer 3 device over a second layer 2 network, the first and second layer 2 networks being distinct;

wherein the network device and the first layer 2 network are under the control of an access service provider (ASP);

wherein the network device connects to a plurality of internet gateways across the second layer 2 network, each internet gateway of the plurality of internet gateways being under the control of a distinct internet service provider (ISP), at least one ISP being distinct from the ASP;

wherein each ISP assigns layer 3 network addresses to clients contracting with that ISP, independently of the other ISPs;

wherein associating the host with the particular next-hop layer 3 device connected to the network device includes:
selecting an ISP that contracts with the client;
associating the host with the internet gateway distinctly under the control of that ISP as the particular next-hop layer 3 device.

2. A method as in claim 1 wherein overwriting the layer 2 destination address of the first layer 2 network packet with the layer 2 network address of the next-hop layer 3 device comprises:
identifying a layer 3 network address of the next-hop layer 3 device;
translating the layer 3 network address of the next-hop layer 3 device into a translated layer 2 network address; and
replacing the layer 2 destination address of the first layer 2 network packet with the translated layer 2 network address.

3. A method as in claim 2 wherein translating the layer 3 network address of the next-hop layer 3 device into a layer 2 network address comprises:
correlating the layer 3 network address of the next-hop layer 3 device with a layer 2 network address from a table of cached Address Resolution Protocol (ARP) entries;
if no correlated entry is present in the table of cached ARP entries, issuing an ARP request to obtain the layer 2 network address.

4. A method as in claim 1 wherein:
the step of forwarding the first layer 2 network packet to the next-hop layer 3 device is performed at the network device;
the step of forwarding the second layer 2 network packet to the client is performed at the network device;
the step of sending the modified first layer 2 network packet over a network, the modified first layer 2 network packet retaining the original layer 2 source address of the first layer 2 network packet includes copying the layer 2 source address from the first layer 2 network packet to the modified first layer 2 network packet without modification; and
the step of sending the modified second layer 2 network packet over the first layer 2 network, the modified second layer 2 network packet retaining the original layer 2 destination address includes copying the layer 2 destination address from the second layer 2 network packet to the modified second layer 2 network packet without modification.

5. A method as in claim 4 wherein:
receiving, at the network device, the first layer 2 network packet from the client includes receiving the first layer 2 network packet over the first layer 2 network; and
receiving, at the network device, the second layer 2 network packet from the next-hop layer 3 device includes monitoring all packets transmitted over the second layer 2 network for packets aimed at the client.

6. A method as in claim 1 wherein:
receiving the second layer 2 network packet from the next-hop layer 3 device includes sniffing all layer 2 network packets received by the network device from the second layer 2 network regardless of the layer 2 destination address of the second layer 2 network packet;
forwarding the second layer 2 network packet to the client includes forwarding the second layer 2 network packet to the client regardless of the layer 2 destination address of the second layer 2 network packet.

7. An apparatus comprising:
a first network interface, having a layer 2 network address, for connecting to a first layer 2 network;
a second network interface for connecting to a second layer 2 network; and
logic configured to:
receive a first layer 2 network packet over the first network interface, the first layer 2 network packet having a layer 2 destination address and a layer 2 source address, the layer 2 destination address of the first layer 2 network packet being the layer 2 network address of the first network interface, the first layer 2 network packet encapsulating a layer 3 network packet, the layer 3 network packet having a layer 3 destination address, the layer 3 destination address being a layer 3 network address of a host;
forward the first layer 2 network packet to a next-hop layer 3 device having a layer 2 network address by (a) associating the host with a particular next-hop layer 3 device connected to the second layer 2 network, (b) creating a modified first layer 2 network packet by overwriting the layer 2 destination address of the first layer 2 network packet with the layer 2 network address of the next-hop layer 3 device, and (c) sending the modified first layer 2 network packet over the second layer 2 network, the modified first layer 2 network packet retaining the original layer 2 source address of the first layer 2 network packet;
receive a second layer 2 network packet over the second network interface, the second layer 2 network packet having a layer 2 destination address and a layer 2 source address, the layer 2 destination address of the second layer 2 network packet being the layer 2 network address of a client; and
forward the second layer 2 network packet to the client by (a) creating a modified second layer 2 network packet by overwriting the layer 2 source address of the second layer 2 network packet with the layer 2 network address of the first network interface and (b) sending the modified second layer 2 network packet over the first layer 2 network, the modified second layer 2 network packet retaining the original layer 2 destination address;
wherein the apparatus and the first layer 2 network are under the control of an access service provider (ASP);
wherein the apparatus connects, via the second network interface, to a plurality of internet gateways across the second layer 2 network, each internet gateway of the plurality of internet gateways being under the control of a distinct internet service provider (ISP), at least one ISP being distinct from the ASP;
wherein each ISP assigns layer 3 network addresses to clients contracting with that ISP, independently of the other ISPs;
wherein the logic configured to associate the host with the particular next-hop layer 3 device connected to the network device includes logic configured to:
select an ISP that contracts with the client; and
associate the host with the internet gateway distinctly under the control of that ISP as the particular next-hop layer 3 device.

8. An apparatus as in claim 7 wherein the portion of the logic configured to overwrite the layer 2 destination address of the first layer 2 network packet with the layer 2 network address of the next-hop layer 3 device comprises logic configured to:
  identify a layer 3 network address of the next-hop layer 3 device;
  translate the layer 3 network address of the next-hop layer 3 device into a translated layer 2 network address; and
  replace the layer 2 destination address of the first layer 2 network packet with the translated layer 2 network address.

9. An apparatus as in claim 8 wherein the portion of the logic configured to translate the layer 3 network address of the next-hop layer 3 device into a layer 2 network address comprises logic configured to:
  correlate the layer 3 network address of the next-hop layer 3 device with a layer 2 network address from a table of cached Address Resolution Protocol (ARP) entries;
  if no correlated entry is present in the table of cached ARP entries, issue an ARP request to obtain the layer 2 network address.

10. An apparatus as in claim 7 wherein:
  the logic configured to receive the second layer 2 network packet from the next-hop layer 3 device includes logic configured to sniff all layer 2 network packets received by the second network interface regardless of the layer 2 destination address of the second layer 2 network packet;
  the logic configured to forward the second layer 2 network packet to the client includes logic configured to forward the second layer 2 network packet to the client regardless of the layer 2 destination address of the second layer 2 network packet.

11. A system comprising:
  a plurality of clients connected to a first layer 2 network;
  a plurality of servers connected to a second layer 2 network, each server having a layer 2 network address; and
  a network device connected to both the first and the second layer 2 networks, the network device having a layer 2 network address, the network device configured to:
    receive a first layer 2 network packet from a client of the plurality of clients over the first layer 2 network, the first layer 2 network packet having a layer 2 destination address and a layer 2 source address, the layer 2 destination address of the first layer 2 network packet being the layer 2 network address of the first network interface, the first layer 2 network packet encapsulating a layer 3 network packet, the layer 3 network packet having a layer 3 destination address, the layer 3 destination address being a layer 3 network address of a host;
    forward the first layer 2 network packet to a server of the plurality of servers, by (a) associating the host with a particular server, (b) creating a modified first layer 2 network packet by overwriting the layer 2 destination address of the first layer 2 network packet with the layer 2 network address of the server, and (c) sending the modified first layer 2 network packet over the second layer 2 network, the modified first layer 2 network packet retaining the original layer 2 source address of the first layer 2 network packet;
    receive a second layer 2 network packet over the second layer 2 network, the second layer 2 network packet having a layer 2 destination address and a layer 2 source address, the layer 2 destination address of the second layer 2 network packet being the layer 2 network address of a client of the plurality of clients; and
    forward the second layer 2 network packet to the client by (a) creating a modified second layer 2 network packet by overwriting the layer 2 source address of the second layer 2 network packet with the layer 2 network address of the first network interface and (b) sending the modified second layer 2 network packet over the first layer 2 network, the modified second layer 2 network packet retaining the original layer 2 destination address;
  wherein the network device and the first layer 2 network are under the control of an access service provider (ASP);
  wherein the plurality of servers includes a plurality of internet gateways, each internet gateway of the plurality of internet gateways being under the control of a distinct internet service provider (ISP), at least one ISP being distinct from the ASP;
  wherein each ISP assigns layer 3 network addresses to clients contracting with that ISP, independently of the other ISPs;
  wherein the network device is configured to associate the host with the particular next-hop layer 3 device connected to the network device by:
    selecting an ISP that contracts with the client; and
    associating the host with the internet gateway distinctly under the control of that ISP as the particular next-hop layer 3 device.

12. A system as in claim 11 wherein each client of the plurality of clients is configured to use the network device as its default gateway, a routing table of each client containing no entries with external layer 3 network addresses other than that of the default gateway.

13. A system as in claim 11 wherein whenever a server of the plurality of servers sends a layer 3 network packet addressed to a client of the plurality of clients, the server encapsulates the layer 3 network packet within a third layer 2 network packet and sends the third layer 2 network packet over the second layer 2 network, the third layer 2 network packet having as its layer 2 destination address the layer 2 network address of the client.

14. A system as in claim 11 wherein:
  the network device is configured to receive the second layer 2 network packet from the next-hop layer 3 device by sniffing all layer 2 network packets received by the network device from the second layer 2 network regardless of the layer 2 destination address of the second layer 2 network packet;
  the network device is configured to forward the second layer 2 network packet to the client by forwarding the second layer 2 network packet to the client regardless of the layer 2 destination address of the second layer 2 network packet.

15. An apparatus comprising:
  a first network interface, having a layer 2 network address, for connecting to a first layer 2 network;
  a second network interface for connecting to a second layer 2 network;
  means for receiving a first layer 2 network packet over the first network interface, the first layer 2 network packet having a layer 2 destination address and a layer 2 source address, the layer 2 destination address of the first layer 2 network packet being the layer 2 network address of the first network interface, the first layer 2 network packet encapsulating a layer 3 network packet, the layer 3 network packet having a layer 3 destination address, the layer 3 destination address being a layer 3 network address of a host;

means for forwarding the first layer 2 network packet to a next-hop layer 3 device having a layer 2 network address by (a) associating the host with a particular next-hop layer 3 device connected to the second layer 2 network, (b) creating a modified first layer 2 network packet by overwriting the layer 2 destination address of the first layer 2 network packet with the layer 2 network address of the next-hop layer 3 device, and (c) sending the modified first layer 2 network packet over the second layer 2 network, the modified first layer 2 network packet retaining the original layer 2 source address of the first layer 2 network packet;

means for receiving a second layer 2 network packet over the second network interface, the second layer 2 network packet having a layer 2 destination address and a layer 2 source address, the layer 2 destination address of the second layer 2 network packet being the layer 2 network address of a client; and means for forwarding the second layer 2 network packet to the client by (a) creating a modified second layer 2 network packet by overwriting the layer 2 source address of the second layer 2 network packet with the layer 2 network address of the first network interface and (b) sending the modified second layer 2 network packet over the first layer 2 network, the modified second layer 2 network packet retaining the original layer 2 destination address;

wherein the apparatus and the first layer 2 network are under the control of an access service provider (ASP);

wherein the apparatus connects, via the second network interface, to a plurality of internet gateways across the second layer 2 network, each internet gateway of the plurality of internet gateways being under the control of a distinct internet service provider (ISP), at least one ISP being distinct from the ASP;

wherein each ISP assigns layer 3 network addresses to clients contracting with that ISP, independently of the other ISPs;

wherein the means for associating the host with the particular next-hop layer 3 device connected to the network device includes means for:

selecting an ISP that contracts with the client; and associating the host with the internet gateway distinctly under the control of that ISP as the particular next-hop layer 3 device.

16. An apparatus as in claim 15 wherein:

the means for receiving the second layer 2 network packet from the next-hop layer 3 device includes means for sniffing all layer 2 network packets received by the second network interface regardless of the layer 2 destination address of the second layer 2 network packet;

the means for forwarding the second layer 2 network packet to the client includes means for forwarding the second layer 2 network packet to the client regardless of the layer 2 destination address of the second layer 2 network packet.

* * * * *